June 25, 1963 W. B. LAUDER ET AL 3,095,266
PRODUCTION OF SODIUM CHROMATE FROM CHROMITE ORES
Filed July 11, 1960
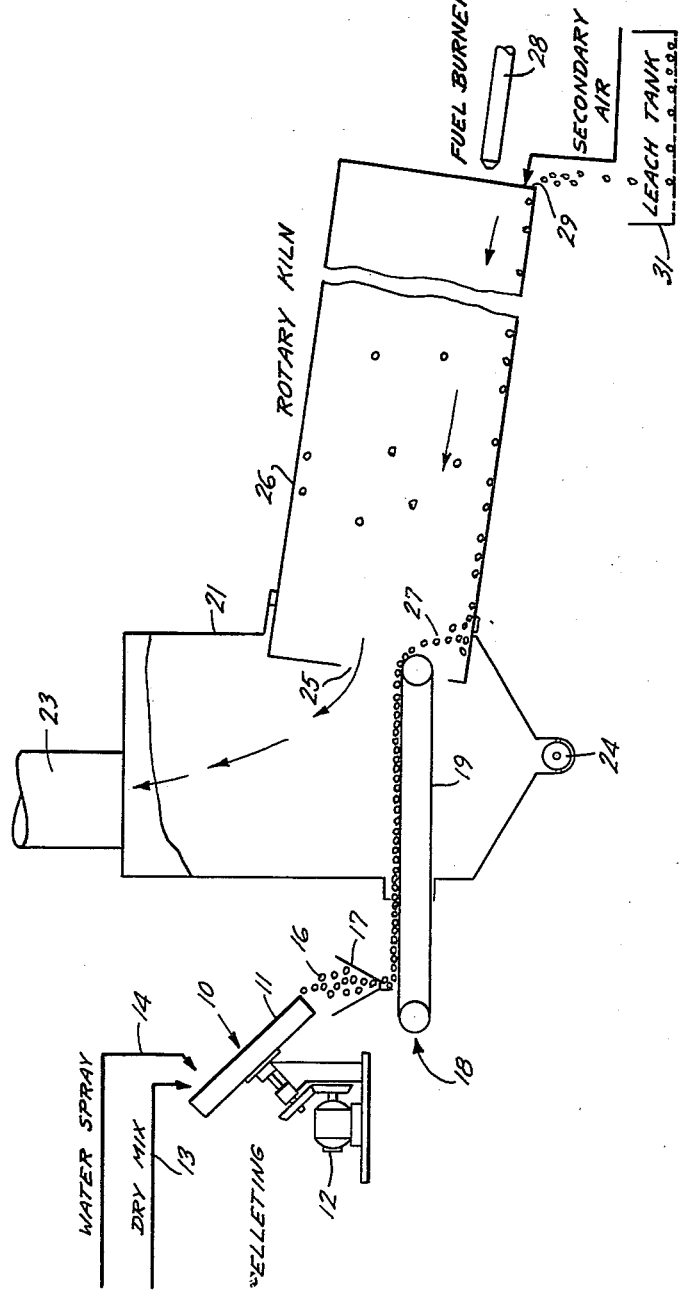
INVENTORS
WILLIAM B. LAUDER
WINSLOW H. HARTFORD
BY
Benjamin Sweedler
ATTORNEY

United States Patent Office 3,095,266
Patented June 25, 1963

3,095,266
PRODUCTION OF SODIUM CHROMATE FROM CHROMITE ORES
William B. Lauder, Syracuse, and Winslow H. Hartford, Fayetteville, N.Y., assignors to Allied Chemical Corporation, New York, N.Y., a corporation of New York
Filed July 11, 1960, Ser. No. 42,184
5 Claims. (Cl. 23—56)

This invention relates to the production of sodium chromate from chromite ores, particularly from noritic ores possessing a relatively low Cr to Fe ratio, which makes them difficult to roast. Such ores are obtained from the Bushveld complex in the Transvaal, the Great Dyke in Southern Rhodesia, and the Stillwater complex in Montana. They have a $Cr_2O_3$ content of from 40% to 55% and a Cr to Fe ratio within the range of 1.3 to 2.3. The expression noritic chromium ores is used herein to refer to such ores.

In this application, unless otherwise indicated, parts and percentages are given on a weight basis.

The heretofore conventional practice of producing sodium chromate from noritic chromium ores involved drying the ore, milling the dried ore to a size such that the pulverized ore passes through a 200-mesh screen, mixing the pulverized ore with finely divided sodium carbonate, leached residue and lime, and charging the powdered mixture into a mechanical furnace, usually a rotary kiln, where the roasting is carried out. This procedure has a number of disadvantages among the more important of which may be mentioned:

(1) Noritic chromium ores, particularly Transvaal ore, are difficult to oxidize and hence relatively low conversions to chromate are obtained by this procedure. Commercial yields have ranged from 75% to 90% water-soluble chromate based on the chromium content of the ore.

(2) In carrying out the roasting, there is a tendency for the ore to form rings on the walls of the kiln and large balls which seriously interfere with the roasting process.

(3) To impart proper mechanical properties to the mixture passed through the kilns, it is the practice to add a quantity of inert or refractory material, usually leached residue, to the ore and pass the resultant mixture through the kiln. This necessitates processing from about 5 to 6.5 pounds of kiln feed for every pound of soluble chromate extracted.

(4) Considerable expense is involved in drying and milling the leached residue prior to its admixture with the ore for processing in the kilns.

(5) The finely divided nature of the mixture charged into the kiln creates a noxious atmosphere, rendering it necessary to make elaborate provisions for the control of dust in the plant. Of the mix constituents, both lime and soda ash are irritating, and the residue may contain some unleached chromates which are known to be harmful to the respiratory organs.

The suggestion has been made that beach sand concentrates, from which substantially all of the silica has been removed by mechanical ore pressing methods, containing chromium, titanium and zirconium, be finely ground, mixed with hydrated lime, soda ash and water, formed into spherules having a size of from ½ to 2 inches or more average diameter, the spherules dried at a temperature of about 570° F., and the dried spherules roasted at a temperature of 1290° F. to 1475° F. Among others, this suggestion has the objection that it results in relatively low conversions to chromates and hence relatively low recovery of sodium chromate. This may explain why this suggestion has not been used commercially.

It is among the objects of the present invention to provide a process for recovering sodium chromate from noritic chromium ores, which process is substantially or completely free of the above noted objections, particularly the objectionable ring and ball formation in the rotary kiln in which the roasting is carried out.

It is another object of this invention to provide such process in which a higher conversion of chromite to chromate per pass through the rotary kiln is obtained.

Still another object of the present invention is to provide such process in which the amount of mix fed through the kiln per pound of soluble chromate recovered is exceptionally low.

Other objects and advantages of this invention will be apparent from the following description thereof.

The present invention involves the following steps:

(1) Mixing per 100 parts of finely ground noritic chromium ore (average particle size from 20 to 75 microns), approximately the stoichiometric amount of sodium carbonate required for reaction with the chromium content to produce sodium chromate, from 60 to 80 parts of hydrated lime (not dolomitic lime) or 75 to 115 parts hydrated dolomitic lime, and from 50 to 70 parts water.

(2) Pelleting this mixture to produce relatively small pellets, desirably having an average size in the direction of the greatest dimension not exceeding about one-half inch, preferably pellets having an average size (size of longest dimension) of from $5/16$ to $7/16$ of an inch. The pellets may be spheroids or of other shape, e.g., cylindrical.

(3) Heating these pellets to a temperature of 900° F. to 1100° F., preferably about 1000° F., to produce hard pellets which will not disintegrate or dust when tumbled at roasting temperatures. The pellets may be thus heated by passing hot gas thereover at a temperature of from 900° F. to 1100° F., or their temperature may be raised gradually at a rate of about 25° F. per minute until they reach the initial roasting temperature of 1500° F.

(4) Effecting the roasting in a rotary kiln by constantly tumbling the hot pellets in an oxidizing atmosphere while flowing the tumbling pellets through the rotating kiln. When air is used as the source of oxygen, the oxidizing atmosphere contains from 6% to 12% by volume of oxygen. Using oxygen-enriched air or oxygen added to recycled kiln gas from which the $CO_2$ has been removed, the oxidizing atmosphere contains up to 60% by volume of oxygen. The temperature of the kiln at the pellet inlet end is about 1000° F. to 1500° F., and at the exit end from 2000° F. to 2200° F. The residence time of the pellets within the kiln is from about 2 to 4 hours, preferably about 3 hours.

(5) Leaching the pellets to recover the sodium chromate.

The formation of the pellets may be effected in any conventional pelleting equipment, such, for example, as a rotating pan which is charged with the pulverized ore, hydrated lime and sodium carbonate while spraying water thereon. By proper adjustment of the flow of the materials and the speed of rotation of the pan, a continuous flow of pellets of the desired size is obtained over the lip of the pan. In the mixture, the water serves as an agglomerant or binder for the solid constituents and also reacts with the sodium carbonate to form a hydrate. This combined action results in pellets having considerable mechanical strength when first formed, such that they retain their shape in the subsequent heating step. The strength of these pellets, unless heated as hereinafter described, is inadequate to permit the necessary tumbling action during the roasting treatment. During the heating step, a further improvement in the mechanical strength of the pellet takes place due chiefly to the formation of hard crusty anhydrous $Na_2CO_3$.

The hydrated lime used is slaked or hydrated lime in ground or finely divided form, e.g., passing through an 80-mesh screen (United States standard screen size). The expression hydrated lime is used herein to include all such forms of hydrated lime including hydrated dolomitic lime. The amount of hydrated lime containing about 70% CaO, admixed with the ore, is from 60 to 80 parts per 100 parts of ore. When added as hydrated dolomitic lime containing about 45% available CaO, from 75 to 115 parts of hydrated dolomitic lime are added per 100 parts of ore. Hydrated dolomitic lime, commonly referred to as hemihydrated dolomitic lime, is preferred. Surprisingly, the use of this form of hydrated dolomitic lime gives the maximum conversion of chromium to the hexavalent form. Hemihydrated dolomitic lime usually contains about 45% calcium oxide, the rest being principally MgO and water of hydration of the CaO; it is hydrated to convert only the calcium oxide to calcium hydroxide; the MgO is not hydrated to any appreciable extent.

The hydrated lime serves a multiplicity of purposes. It is important to use hydrated lime because the use of unhydrated lime results in pellets of unsatisfactory strength, probably due to hydration of the lime within the pellet which causes expansion and results in rupture of the pellet. Hydrated lime is plastic when moist and hence aids pellet formation. It is more reactive than quick lime in the kilns. It accelerates the roasting treatment.

The hydrated lime also fulfills all of the functions and has all of the advantages of non-hydrated lime, namely, it combines with alumina, silica and iron in the ore to prevent the formation of soluble silicates and aluminates in the leach liquors; it serves as a diluent to reduce the percentage of fusible material in the kilns; and it reduces sodium losses, i.e., results in a reduction in the amount of insoluble sodium compounds in the residue.

The amount of hydrated lime is critical. Utilization of more than the amounts hereinabove given results in combination of the lime with the chromium to form insoluble complex calcium chromates. By employing amounts of hydrated lime within the ranges above given, the formation of such insoluble complex calcium chromates is minimized. It will be appreciated that when employing a hydrated lime containing an appreciably different CaO content than given above, an amount of such hydrated lime is used to supply CaO equivalent in amount to that contained by the above disclosed 60 to 80 parts of hydrated lime (not dolomitic) and 75 to 115 parts of hydrated dolomitic lime.

If desired, leached refuse from a previous run may be incorporated in the mixture subjected to pelleting to improve the mechanical behavior of the pellets in the kiln. Such leached residue is in addition to the hydrated lime, which, as noted, improves mechanical behavior of the pellets in the kiln. In the case of hydrated dolomitic lime, the magnesium oxide content thereof provides an ideal diluent for the ore mix because it is inert; hence, no leached refuse need be incorporated in a mixture containing hydrated dolomitic lime subjected to pelleting. Using other forms of hydrated lime, some leached residue, but less than heretofore employed, is incorporated in the mixture subjected to pelleting. The amount of leached residue used need not exceed 60 parts per 100 parts of ore.

The particle size of the sodium carbonate and also of the hydrated lime is not critical as long as it is small enough to permit adequate mixing with the ore and to result in uniform dispersion of the ore particles relative to the soda ash and hydrated lime particles. Commercial light soda ash and the hydrated lime of commerce have satisfactory particle sizes. In general, for best results the constituents of the mix subjected to pelleting should have a particle size of from 20 to 125 microns.

While it is preferred to dry the ore before pulverizing it and mixing the pulverized dried ore with the other pelleting constituents, this invention comprehends the wet grinding of the ore containing the correct amount of water to completely slake the lime later added to the ore and then mixing the ground ore with the appropriate quantity of lime, whereupon slaked lime (calcium hydroxide) is produced in situ. Should the ore be unduly wet, it is dried to reduce the water content to that which will react with the lime to slake it. The mixture of slaked lime and ore, now dry because of absorption by the lime of the water content in the wet ore, is then mixed with sodium carbonate and additional water and pelleted.

The bond in the freshly formed pellet appears to depend chiefly on the formation of sodium carbonate monohydrate. When the pellet is heated to the high temperatures involved in the present process, a stronger bond results due probably chiefly to the formation of anhydrous sodium carbonate with consequent production of hard scale and crusts which produce a strong pellet. The presence of calcium hydroxide and the sodium carbonate particles result in the ore particles being dispersed uniformly relative to the other constituents within each pellet. Notwithstanding that the pellets are sufficiently hard to be tumbled in the rotary kiln without disintergrating or substantial dusting, the pellets are still porous enough for the oxidizing atmosphere present in the rotary kiln to have access to the ore particles within the interior of the pellet so that substantially all chromium present is converted to sodium chromate.

Heating of the pellets to a temperature of 900° F. to 1100° F. desirably is accomplished by passing them through the exit gas stream from the kilns at a temperature of from 1000° F. to 1400° F.

The single FIGURE of the drawing is a diagrammatic flow sheet of the process.

In this drawing 10 is a conventional pelleting machine comprising a rotating pan 11 driven by a motor 12 and which is continuously fed dry mix from line 13 and water from line 44 in the proportions above given. Pellets 16 are thus formed and are continuously discharged into a hopper 17 which feeds them onto a conveyor 18 desirably in the form of a foraminous belt 19. This belt feeds the pellets into a kiln dust chamber 21 provided with a stack 23 and a conveyor screw 24 at its base for removing dust and other settled matter from chamber 21.

Hot gases from the pellet-inlet end 25 of rotary kiln 26 flow through dust chamber 21 heating the pellets conveyed therethrough by conveyor 18. The heated pellets are discharged at 27 into the rotating kiln 26 and tumbled through the downwardly inclined kiln 26 countercurrent to the flow of hot gases-oxygen mixture passing through kiln 26. These hot gases desirably are produced by burning a suitable fuel supplied by burner 28 at the pellet discharge end 29 of the kiln. Secondary air to support combustion of the fuel and to supply the desired oxygen in the kiln is introduced at the discharge end 29 of the kiln as indicated by the arrow associated with the legend "secondary air" on the drawing. The other arrows indicate the direction of flow of hot combustion products and oxygen through the kiln 26 and chamber 21.

Using air to supply the oxygen content of the oxidizing atmosphere in kiln 26, the atmosphere in contact with the roast near the kiln discharge end 29 is chiefly air because the kiln is under draft provided by stack 23 and the secondary air for combustion enters at the pellet discharge end of the kiln. As the secondary air mixes with the fuel and combustion products, the oxygen content of the resultant gaseous mixture diminishes. Thus throughout most of the length of the kiln, except at the discharge end 29, where, as noted, the atmosphere is chiefly air, the oxygen content within the kiln is maintained sufficiently high to provide an oxidizing atmosphere. The oxygen content of the gases leaving the kiln under these conditions is within the range of from 6% to 12% oxygen by volume.

As noted, oxygen-enriched air or oxygen-enriched kiln gas from which the $CO_2$ has been removed may be supplied to the kiln to provide the oxidizing atmosphere. Operating under these conditions, the oxygen content of the kiln gases leaving the kiln may be from 6% to 60% oxygen by volume. Such kiln gases, particularly when containing appreciable amounts of oxygen, say above about 20%, are recirculated through the kiln, after removing carbon dioxide therefrom, to avoid loss of oxygen.

The hot pellets from the kiln are discharged into one or more leach tanks 31, each having a perforated or screen bottom. These tanks may accommodate from 25 to 60 tons of roast per tank. Weak sodium chromate solution covers the hot roast and percolates through it. Strong sodium chromate solution is removed from the bottom of the tank and the level of solution over the roasted pellets is maintained by addition of weak sodium chromate solution to the tank. Sodium chromate solution is usually removed from the tank when it has a concentration of about six pounds of sodium chromate per gallon and the solution from the base of the tank continues to be removed as long as the concentration remains relatively high, above say about 3½ to 4 pounds of sodium chromate per gallon. When this point is reached, the liquor flow from the tank is stopped, the pellets covered with water and the run-off from the tank sent to weak solution storage for use on the next batch of roast. When the roast is essentially completely leached, the tank is drained and the leached material, if desired, employed as a diluent in the pelleting operation or discarded.

The strong sodium chromate solution thus produced is concentrated or otherwise further processed in accordance with conventional techniques.

In general, for 100 tons of pellets about 19,000 gallons of water and about 15,000 gallons of weak recycle solution are employed in the leaching operation.

The following examples of the process of this invention are given to exemplify it. It will be understood, however, that the invention is not limited to these examples. In these examples, all parts are on a weight basis.

*Example I*

100 parts Transvaal chrome ore concentrate containing 46.73% $Cr_2O_3$, 76 parts of high-calcium hydrated lime containing 72.2% CaO, 65 parts of soda ash, and 30 parts of leached residue from a previous run and containing about 4.35% of $Cr_2O_3$, are pelleted in a rotary pelleter of the pan type by the addition of 60 parts of water. The pellets produced have a diameter of from 5/16 to 7/16 of an inch. They are heated slowly over a period of about 1½ hours to 1000° F. by passage in direct heat exchange with the hot gases at a temperature of about 1400° F. from a rotating kiln.

The hot hard pellets thus produced are charged into the rotating kiln, in which is present an atmosphere of from 6% to 12% by volume of oxygen, and which at the pellet inlet end is at a temperature of about 1400° F. and at the exit end at a temperature of about 2200° F. The residence time of the pellets in the rotary kiln is 3 hours. The pellets passing through this kiln are constantly tumbled as they travel through the oxidizing atmosphere.

The roasted product is collected and analyzed. Each pellet contains about 19.6% $Cr_2O_3$, of which 97.3% is oxidized and 89.6% is water-soluble. The water-soluble chromium in all the pellets corresponds to 92.1% extraction of the chromium content of the ore. The roasted product contains 37.4% water-soluble chromate as $Na_2CrO_4$. Only 2.68 pounds of roast are processed in this example for each pound of chromate recovered. This represents a decrease of about 50% in the amount of kiln feed required per pound of chromate recovered as compared with heretofore known procedures.

*Example II*

100 parts of ore of the same type as employed in Example I, 90 parts of dolomitic lime (containing about 47% CaO and hydrated to form the hemihydrate), 65 parts soda ash, all in pulverized condition, are pelleted with the addition of 61 parts of water in a rotating pan pellet-forming machine. The pellets have an average size of 7/16 inch. They are dried and hardened by slow heating to 1000° F. by passage in direct heat exchange relation with the exit hot gases from the rotary kiln.

The hot hard pellets are charged into the rotary kiln in which an oxidizing atmosphere is present and in which the temperature varies from 1400° F. at the pellet inlet end to 2200° F. at the pellet exit end. The residence time of the pellets is 3 hours.

Each roasted pellet contains 20.5% $Cr_2O_3$, of which 99.7% is oxidized and 97.3% is water-soluble. The roasted pellets contain 42.4% water-soluble sodium chromate.

Only 2.36 pounds of kiln product are required for each pound of chromate recovered.

The pellets are leached as hereinabove described. The chromium content of the leached residue is of the order of 3% $Cr_2O_3$ by weight.

In both of the above examples, the roasting proceeds smoothly; no rings or balls of ore agglomerates are formed.

It will be noted that the present invention provides a process of recovering sodium chromate from chromite ores including the Transvaal ore, which is difficult to oxidize but is economically attractive, which process results in exceptionally high yields of chromate, eliminates the tendency to form rings and large balls which seriously interfere with the roasting process in the rotary kilns, and in which the amount of mix fed through the kiln per pound of soluble chromate recovered is exceptionally low. The present invention requires a feed of about and even less than 3 pounds of kiln product for each pound of soluble chromate recovered. As compared with heretofore known roasting procedures, this is a reduction of more than 2 pounds of kiln feed per pound of soluble chromate recovered, i.e., the total kiln feed may be as much as halved for the same recovery of soluble chromate.

Moreover, since the present invention involves the use of hydrated lime, the mixing of the pellet constituents in the presence of water, and the charging of pellets into the roasting kiln, dust formation is greatly minimized. The noxious atmospheres heretofore prevailing due to the charging of the pulverized lime, soda ash, etc., into the kiln is completely eliminated.

Since certain changes may be made in carrying out the above process without departing from the scope of the invention, it is intended that all matter contained in the above description shall be interpreted as illustrative and not in a limiting sense.

What is claimed is:

1. The process of producing sodium chromate from chromium ores containing at least 40% $Cr_2O_3$, which process comprises mixing powdered ore, hydrated lime from the group consisting of non-dolomitic and dolomitic lime, soda ash and water in the proportions of from 60 to 80 parts of hydrated non-dolomitic lime when using the latter and 75 to 115 parts of hydrated dolomitic lime when using hydrated dolomitic lime, 50 to 70 parts water per 100 parts of ore and approximately the stoichiometric amount of soda ash required to react with the chromium content of the ore to produce sodium chromate, pelleting said mixture to produce small pellets, each of said small pellets containing substantially the same relative proportions of the hydrated lime, water, soda ash and powdered ore as in the mixture subjected to pelleting, with the powdered ore particles dispersed substantially uniformly relative to the other constituents within each pellet, heating said pellets to a temperature of from 900° to 1100° F. to produce strong, hard pellets, roasting said resulting hard pellets by passing them through an oxidizing atmosphere varying in temperature from 1000° F. to 1500° F. at the pellet-inlet end to from about 2000° F. to 2200° F. at the pellet-exit end of said oxidizing atmosphere and leaching the thus roasted pellets to remove the sodium chromate therefrom.

2. The process of producing sodium chromate from chromium ores containing at least 40% $Cr_2O_3$, which comprises mixing powdered ore, hydrated lime from the group consisting of non-dolomitic and dolomitic lime, soda ash and water in the proportions of from 60 to 80 parts of hydrated non-dolomitic lime when using the latter and 75 to 115 parts of hydrated dolomitic lime when using hydrated dolomitic lime, 50 to 70 parts water per 100 parts of ore and approximately the stoichiometric amount of soda ash required to react with the chromium content of the ore to produce sodium chromate, pelleting said mixture to produce small pellets having an average size not exceeding about ½ inch in their longest dimension, each of said small pellets containing substantially the same relative proportions of the hydrated lime, water, soda ash and powdered ore as in the mixture subjected to pelleting, with the powdered ore particles dispersed substantially uniformly relative to the other constituents within each pellet, heating said pellets to a temperature of from 900° F. to 1100° F. to produce strong, hard pellets, roasting said resulting hard pellets by passing them through an oxidizing atmosphere varying in temperature from 1000° F. to 1500° F. at the pellet-inlet end to from about 2000° F. to 2200° F. at the pellet-exit end of said oxidizing atmosphere, while tumbling said pellets in said atmosphere, said pellets being passed through said atmosphere at a rate such that they remain therewithin for from 2 to 4 hours, and leaching the thus roasted pellets to remove the sodium chromate therefrom.

3. The process of producing sodium chromate from chromium ores having a $Cr_2O_3$ content of from 40% to 55% by weight and a Cr to Fe ratio within the range of from 1.3 to 2.3, which process comprises mixing per 100 parts of powdered ore from 60 to 80 parts of non-dolomitic hydrated lime, enough soda ash to react with substantially all of the chromium in the ore to produce sodium chromate and from 50 to 70 parts of water, pelleting said mixture to produce small pellets having an average size not exceeding about ½ inch in their longest dimension, each of said small pellets containing substantially the same relative proportions of the hydrated lime, water, soda ash and powdered ore as in the mixture subjected to pelleting, with the powdered ore particles dispersed substantially uniformly relative to the other constituents within each pellet, heating said pellets to a temperature of from 900° F. to 1100° F. by passing the pellets in direct heat exchange relation with exiting hot gases from a rotary kiln employed to roast the pellets to produce strong, hard pellets, roasting said resulting hard pellets in said kiln by passing them therethrough while maintaining therein an oxidizing atmosphere containing from 6% to 60% oxygen, said kiln having an inlet temperature of about 1000° F. to 1500° F. and an exit temperature of 2000° F. to 2200° F., and said heated pellets being supplied to and the roasted pellets being withdrawn from said kiln at a rate such that the pellets remain within said kiln for about 3 hours and leaching the thus roasted pellets to remove their sodium chromate content.

4. The process of producing sodium chromate from chromium ores having a $Cr_2O_3$ content of from 40% to 55% by weight and a Cr to Fe ratio within the range of from 1.3 to 2.3, which process comprises mixing per 100 parts of powdered ore from 75 to 115 parts of hydrated dolomitic lime, enough soda ash to react with substantially all of the chromium in the ore to produce sodium chromate and from 50 to 70 parts of water, pelleting said mixture to produce small pellets having an average size not exceeding about ½ inch in their longest dimension, each of said small pellets containing substantially the same relative proportions of the hydrated lime, water, soda ash and powdered ore as in the mixture subjected to pelleting, with the powdered ore particles dispersed substantially uniformly relative to the other constituents within each pellet, heating said pellets to a temperature of from 900° F. to 1100° F. by passing the pellets in direct heat exchange relation with exiting hot gases from a rotary kiln employed to roast the pellets to produce strong, hard pellets, roasting said resulting hard pellets in said kiln by passing them therethrough while maintaining therein an oxidizing atmosphere containing from 6% to 60% oxygen, said kiln having an inlet temperature of about 1000° F. to 1500° F. and an exit temperature of 2000° F. to 2200° F., and said heated pellets being supplied to and the roasted pellets being withdrawn from said kiln at a rate such that the pellets remain within said kiln for about 3 hours and leaching the thus roasted pellets to remove their sodium chromate content.

5. The process of producing sodium chromate as defined in claim 2, in which the hydrated lime is produced in situ by mixing wet ore with the lime to effect hydration of the lime by the water content of the ore.

References Cited in the file of this patent

UNITED STATES PATENTS

| | | |
|---|---|---|
| 2,394,793 | Maier | Feb. 12, 1946 |
| 2,416,550 | Udy | Feb. 25, 1947 |
| 2,501,952 | Maier | Mar. 28, 1950 |
| 2,639,216 | Bonner | May 19, 1953 |
| 2,839,359 | Dunning | June 17, 1958 |